United States Patent
Buck et al.

(10) Patent No.: US 9,767,239 B1
(45) Date of Patent: Sep. 19, 2017

(54) TIMING OPTIMIZATION DRIVEN BY STATISTICAL SENSITIVITES

(71) Applicant: International Business Machines Corporation, Armonk, NY (US)

(72) Inventors: Nathan C. Buck, Underhill, VT (US); Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shuma, Underhill, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/298,921

(22) Filed: Oct. 20, 2016

(51) Int. Cl.
*G06F 17/50* (2006.01)

(52) U.S. Cl.
CPC ...... *G06F 17/5036* (2013.01); *G06F 17/5081* (2013.01); *G06F 17/5022* (2013.01);
(Continued)

(58) Field of Classification Search
CPC ............. G06F 17/5031; G06F 17/5045; G06F 17/5036; G06F 17/5081; G06F 2217/12;
(Continued)

(56) References Cited

U.S. PATENT DOCUMENTS 7,428,716 B2 * 9/2008 Visweswariah ..... G06F 17/5031
703/16
7,437,697 B2 10/2008 Venkateswaran et al.
(Continued)

OTHER PUBLICATIONS

Krstic et al.; "Delay defect diagnosis based upon a statistical timing model—the first step"; Year: 2003; IEE Proceedings—Computers and Digital Techniques; vol. 150, Issue: 5; p. 346-54.*
Davoodi et al.; "Variability Driven Gate Sizing for Binning Yield Optimization"; Year: 2008; IEEE Transactions on Very Large Scale Integration (VLSI) Systems; vol. 16, Issue: 6; pp. 683-692.*
(Continued)

*Primary Examiner* — Helen Rossoshek
(74) *Attorney, Agent, or Firm* — Scully, Scott, Murphy & Presser, P.C.; Steven J. Meyers, Esq.

(57) ABSTRACT

System and methods for achieving a timing closure in a design of an integrated circuit in presence of manufacturing variation. The method includes running a timing engine of a statistical timing analysis tool performing at least one optimization to fix at least one violation of at least one timing quantity at an integrated circuit location. The method includes choosing at least one optimization to apply and finding at least one failing timing quantity, where the quantity is failing due to at least one source of variability which the optimization would impact. The optimization is applied to at least one section of the path leading to the failing timing quantity, where the section contributes to the source of variability. Statistical sensitivity information in canonical form guides the optimization by providing a fully parameterized canonical form of the identified timing violations.

22 Claims, 7 Drawing Sheets

(52) U.S. Cl.
CPC ...... *G06F 17/5031* (2013.01); *G06F 17/5045* (2013.01); *G06F 2217/10* (2013.01); *G06F 2217/12* (2013.01); *G06F 2217/84* (2013.01)

(58) Field of Classification Search
CPC ............. G06F 17/5022; G06F 2217/10; G06F 2217/84
See application file for complete search history.

(56) References Cited

U.S. PATENT DOCUMENTS

| | | | |
|---|---|---|---|
| 7,487,486 B2 | 2/2009 | Celik et al. | |
| 7,712,055 B2 | 5/2010 | Liu et al. | |
| 7,844,932 B2* | 11/2010 | Buck | G06F 17/5031 716/113 |
| 7,861,199 B2 | 12/2010 | Visweswariah et al. | |
| 8,010,921 B2* | 8/2011 | Visweswariah | G06F 17/5031 703/16 |
| 8,141,014 B2* | 3/2012 | Foreman | G06F 17/5031 716/108 |
| 8,141,025 B2 | 3/2012 | Sinha et al. | |
| 8,151,229 B1 | 4/2012 | Chang et al. | |
| 8,468,483 B2* | 6/2013 | Buck | G06F 17/5031 716/113 |
| 8,732,642 B2 | 5/2014 | Visweswariah et al. | |
| 2013/0104092 A1* | 4/2013 | Buck | G06F 17/5031 716/113 |

OTHER PUBLICATIONS

Liou et al.; "Path selection for delay testing of deep sub-micron devices using statistical performance sensitivity analysis"; Year: 2000; Proceedings 18th IEEE VLSI Test Symposium; pp. 97-104.*

Liou et al.; "Modeling, testing, and analysis for delay defects and noise effects in deep submicron devices"; Year: 2003; IEEE Transactions on Computer-Aided Design of Integrated Circuits and Systems; vol. 22, Issue: 6; pp. 756-769.*

Wilde et al.; "Probabilistic Analysis of the Influences of Design Parameter on the Reliability of Chip Scale Packages"; Year: 2006; EuroSime 2006—7th International Conference on Thermal, Mechanical and Multiphysics Simulation and Experiments in Micro-Electronics and Micro-Systems; pp. 1-8.*

Liu, "On VLSI Statistical Timing Analysis and Optimization", IEEE Xplore, Conference ASIC, 2009, ASICON '09, IEEE 8th Intenational Conference on, Nov. 2009; pp. 718-721.

Guthaus et al., "Gate Sizing Using Incremental Parameterized Statistical Timing Analysis", International Conference on Computer-Aided Design (2005) San Jose, CA, USA, May 31, 2005, pp. 1023-1033.

Li et al., "Defiining Statistical Sensitivity for Timing Optimization of Logic Circuits with Large-Scale Process and Environmental Variations", International Conference on Computer-Aided Design (2005) San Jose, CA, USA, May 31, 2005, pp. 843-851.

Sinha et al. "Statistical Gate Sizing for Timing Yield Optimization", International Conference on Computer-Aided Design (2005) San Jose, CA, USA, May 31, 2005, pp. 1034-1039.

* cited by examiner

| Process variable | Transforms which decrease sensitivity to this variable |
|---|---|
| Metal | Demote / promote wires (to change balance of layers along the path)<br>Buffer<br>Move boxes (to change gate/wire imbalance)<br>Power up a cell |
| ACV | Move critical data nets closer to corresponding clock nets<br>Swap cell to a different VT level / Power up |
| Voltage | Power up a cell |
| SiProcess | Swap cell to a lower VT level |
| Temperature | Swap cell to a different VT level (to fix temperature inversion)<br>Buffer<br>Move boxes (to change gate/wire imbalance) |
| Thermal Effects | Logic spreading to avoid hotspots<br>Power down a cell |
| EOL / NBTI | Swap cell to a higher VT level |

TIMING OPTIMIZATION DRIVEN BY STATISTICAL SENSITIVITES

FIELD

The present disclosure relates generally to the design and optimization of integrated circuits. More particularly, the present disclosure relates to electronic design automation of integrated circuits and particularly to a system and methods for improving the design of integrated circuits by automating the optimization of circuit designs using statistical timing analysis.

BACKGROUND

In the area of electronic design automation, there may be tests conducted at the physical design stage of an integrated circuit to determine a diagnosis and a tolerance of a timing process. Exemplary tests for evaluating timing of a circuit include setup-time violation and hold-time violation tests. As known, a setup time is that amount of time the data at a synchronous data input (e.g., data at a flip flop) must be stable before the active edge of a clock is received, and a hold time is the amount of time the data at a synchronous input of a flip-flop must be stable after receipt of the active clock edge. Further timing tests detect a violation of a timing value or circuit parameter, e.g., cap/slew violation, in a semiconductor circuit or circuit timing path that may be caused by nanometer scale process manufacturing defects or design timing model variations which may cause silicon to fail these tests during the physical design stage. Setup and hold time violations are typically detected to occur in a data shift operations or in system logic operations.

Given technology advances and integration of a broad spectrum of intellectual property continues to push the limits of power in all semiconductor applications. Currently, there are many techniques to fix setup test violations and cap/slew violations. Such techniques may include, for example, threshold voltage (VT) swaps, gate resizing, gate moving, layer promotion/demotion, buffer insertion, logic restructuring, etc.

Currently, however, it is the case that there is only a single technique to fix hold time test violations. This technique involves implementing an additional data path padding with buffers to increase the data path delay. The data path is the path wherein data traverses and may be a pure combinational path having any basic combinational gates or group of gates.

However this solution only leverages the projected slack or the worst slack across the variability space. Moreover, with increasing variability means that this test strategy may likely not hold up. For example, at a minimum, this solution may be inefficient in terms of power/area.

With the technology node becoming smaller in the future, on the order of nanometers, the manufacturing variability increases, and more timing violations can be expected thereby increasing the difficulty of achieving a timing optimization. As one source of variability, operating voltage differences may have a dramatic effect on circuit timing operations. For example, the circuit may operate nominally at a first voltage (e.g., 0.9 V), but in reality may operate at that nominal voltage plus or minus a tolerance (e.g., +/−0.2 volts). Thus, the timing delay variability may be due to a variety of different variables and circuit designers design circuits that account for this variability.

As circuits are being manufactured, it may be determined that there is much process variability and manufacturing variations. Further, as chips may not be printed exactly the same way each time leads to variability in timing violations such as delay and slew.

In future technologies, there will be further need to simultaneously optimize such circuits for: high/low voltages, and high/low frequency circuit models.

Issued U.S. Pat. No. 8,732,642 teaches a method using statistical timing analysis tools to optimize an integrated circuit design by analyzing a local failing statistical quantity, and identifying optimization transforms that can resolve the local fail. This is done by using pre-characterized "goodness" metrics (e.g., slack) so that, even without incremental timing, there is obtained an estimate of how much improvement may be achieved. This technique requires a pre-characterized metric, and has no ability to analyse an entire path leading to the failing quantity.

SUMMARY

A system, method and computer program product for exploiting capabilities of statistical timing analysis techniques used to detect and analyze timing failures in integrated circuits to identify a cause of timing violations, i.e. sources of variations with too high variability, and to fix timing fails at circuit locations in a power-efficient manner.

In one embodiment, the system and method picks an optimization, and then finds specific sections of failing paths (wires, gates and nets) that contribute the most to the criticality. The system and method then applies transforms targeted to specific sources of variability.

In one aspect, the system and method looks at a particular circuit and an existing sensitivity signature for a failing timing slack or slew, and guides an optimization engine on how best to repair the timing failure given the signature.

The system and method further identifies a cause of timing violations, i.e., sources of variations with too high variability, using statistical timing, and uses this knowledge to fix timing fails in a power-efficient manner. By mining technology and chip manufacturing data, for example, there may be generated a mapping of a process variable used in the production of a semiconductor device or circuit and a transform that modifies sensitivity to this mapping variable.

In one aspect, there is provided a method of manufacturing an integrated circuit. The method comprises: using a computer, running a statistical timing analysis (STA) for identifying timing violations at a location in a circuit design; for an identified timing violation, determining a failing sensitivity resulting in the timing violation; using the computer, identifying one or more gates/nets which contribute to the failing sensitivity at the location; using the computer, receiving and applying a transform comprising an action to change sensitivity to this variable for one or more of the gates/nets targeted for statistically reducing a probability of the failing sensitivity at the location; using the computer, conduct a further statistical timing analysis for determining whether the timing violation was improved using the applied transform, wherein the transform is iteratively applied to the one or more gates/nets based on a ranked list ordering of the paths until the timing violation is corrected, and using said computer to configure a tool for manufacturing said integrated circuit using said applied transform to the one or more gates/nets of the circuit design.

In a further aspect, there is provided an apparatus for manufacturing an integrated circuit. The apparatus comprises: a hardware processor; a memory storage device storing instructions, the instructions for configuring the hardware processor to perform a method to: run a statistical timing analysis (STA) for identifying timing violations at a location in a circuit design; for an identified timing violation, determine a failing sensitivity resulting in the timing violation; identify one or more gates/nets which contribute to the failing sensitivity at the location; receive and apply a transform comprising an action to change sensitivity to this variable for one or more of the gates/nets targeted for statistically reducing a probability of the failing sensitivity at the location; conduct a further statistical timing analysis for determining whether the timing violation was improved using the applied transform, wherein the transform is iteratively applied to the one or more gates/nets based on a ranked list ordering of the paths until the timing violation is corrected, and use said computer to configure a tool for manufacturing said integrated circuit using said applied transform to the one or more gates/nets of the circuit design.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

Preferred embodiments of the invention will now be described, by way of example, with reference to the accompanying drawings.

DETAILED DESCRIPTION

According to an embodiment of the present invention, a system and method integrates statistical timing techniques and exploits capabilities of statistical timing to identify a cause of a timing violation, i.e., sources of process variable variations with exceedingly high variability, and uses this knowledge to fix timing fails in a power-efficient manner. The system and method provides for a more efficient VLSI circuit design timing closure procedure, reduced computational resources, and designs with fewer timing violations, lower area and lower power.

During chip design and manufacture, in statistical timing analysis the entire chip design is analyzed and measurements taken for delay of signals propagating through each circuit (e.g., transistors, flop-flops, wires, etc.) and measurements taken of circuit slew.

Figure 1A:
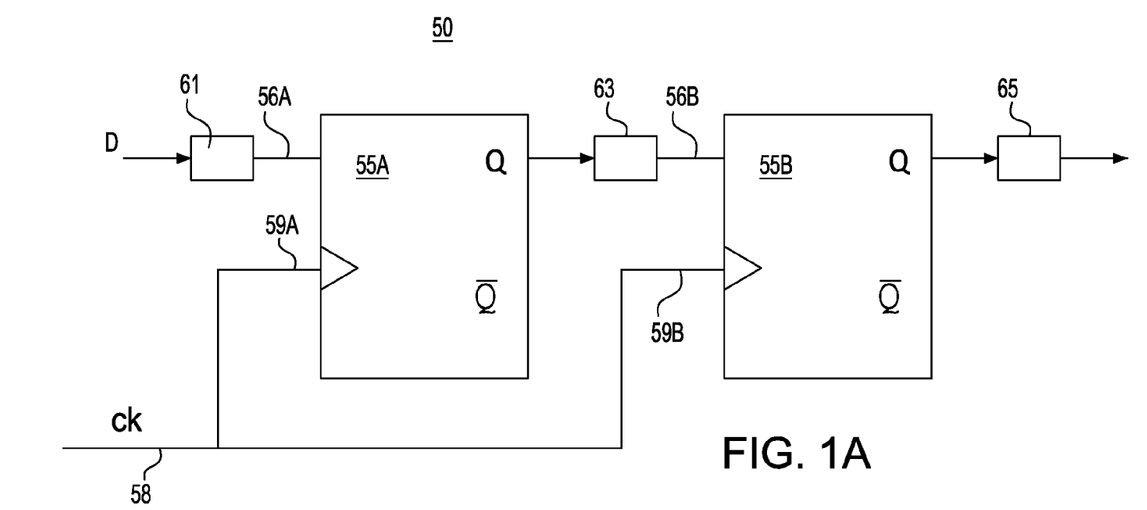
FIG. 1A depicts an example manufacturing production circuit to which a statistical timing analysis may be performed to optimize the timing according to the embodiments herein.

In consideration of the techniques described herein, FIG. 1A shows an example circuit 50 comprising sequential elements 55A and 55B, e.g., a latch, Data flip-flop, or bi-stable multi-vibrator, etc., and a variety of circuit elements 61, 63 and 65 each forming combinational logic that processes the data signal (D) propagating on a timing path, for example. The flop-flop elements 55A, 55B each receive data at respective data signal inputs (e.g., pins) 56A, 56B, and a separate clock signal (ck) propagating on a separate signal path 58 is input to each element 55A, 55B at respective clock inputs (e.g., pins) 59A, 59B for controlling latching and data propagation at each respective element. As known, when the clock signal ck is high, data D may be propagated through an element, however, when the clock signal ck is low, data D may not be propagated through an element.

Further as known, two different timing checks known as setup and hold checks are most commonly used to types of timing checks used in timing verification. Synchronous element inputs (e.g. D) have a setup time and a hold time specification with respect to the clock input. These checks specify that the data input must remain stable for a specified interval before and after the clock input changes. For example, a setup time is an amount of time a synchronous input (D) of the flip-flop must arrive and be stable before the capturing edge of the clock signal ck, i.e., the data has to arrive within a certain window of time. Hold violation is when the data arrives too early at the flip-flop.

A timing path is defined as a path between a start point and an end point where a start point includes all input ports or clock pins of a sequential element (e.g., a flip flop) and an end point includes any output port (Q) or data (D) pin of the sequential element.

For Static Timing Analysis (STA) a circuit design may be split into different timing paths and each timing path delay is calculated based on gate delays and net delays. In a timing path, data gets launched and traverses through combinational elements, e.g., 61, 63, etc. and stops when it encounters a sequential element, e.g., 55a, 55B. In any timing path, a setup violation occurs when the data gets to the input pin too late for the clock to receive it. To fix a setup violation, there can be performed slowing down the clock (e.g., increase its period) or decreasing the delay of the data path logic. In a timing path, a "hold" time is the amount of time the synchronous input (D) stays long enough after the capturing edge of clock so that the data can be latched. Hold violations can be fixed by increasing the delay of the data path, e.g., such as by use of padding with buffers in the signal line, or by decreasing a clock uncertainty (e.g., a clock skew).

In consideration of the techniques described herein, statistical timing analysis computes a "slack" which is a measure of "goodness" defined as a difference between an actual or achieved time and the desired time for a timing path. For a timing path, slack determines if the design is working at the specified speed or frequency. A "positive" slack signifies that the timing is met, e.g., data arrives timely as the clock transitions, and a negative "slack" implies a timing violation, e.g., data arrives too late and is not captured correctly. The process of optimization consists of iteratively making moves until a positive slack is achieved for each timing test. STA software tools typically supports slack queries to aid in the optimization process.

In implementations, thousands or millions of such timing tests may be performed in a given chip design. Thus, in one embodiment, an automated optimization tool is provided to target a "negative" slack and correct any particular failure/problem. For example, if the data arrives too late in a setup test timing analysis, for instance, in the event a long wire with a large delay contributes to the late signal, it may be buffered to reduce the overall delay and to improve the timing. In an example hold test fail, there may be data arriving too early, and the data has to be slowed down. Thus, extra stages of logic may be implemented or added in the data path so as to slow down the data propagation.

It is understood that there may be further "timing" violations such as on a signal transition time or "slew" which can cause problems for the electrical characteristics of the transistor if the slew is too high. Moreover, the total capacitance that an inverter may drive may also cause timing problems for a transistor driving the capacitive load. As known, for any failing timing quantity, e.g., slack, slew, a required arrival time, a drive capacitance, etc., there are mitigating design considerations to correct the timing fail issue, e.g., moving a gate, moving a wire to a higher layer, or making a wire thicker or thinner to avoid a problem, insert a buffer, re-power a gate, change a threshold voltage, restructure the logic, change the routing, etc.

In one embodiment, a statistical timing analysis tool is implemented that combines all sources of variability into one single statistical quantity, a "canonical form" which is a statistical distribution model. Thus, a distribution of slacks may be obtained for every point in a joint probability distribution function (jpdf) which describes the variation in timing quantity response over the range of variability conditions being modelled.

Figure 2:
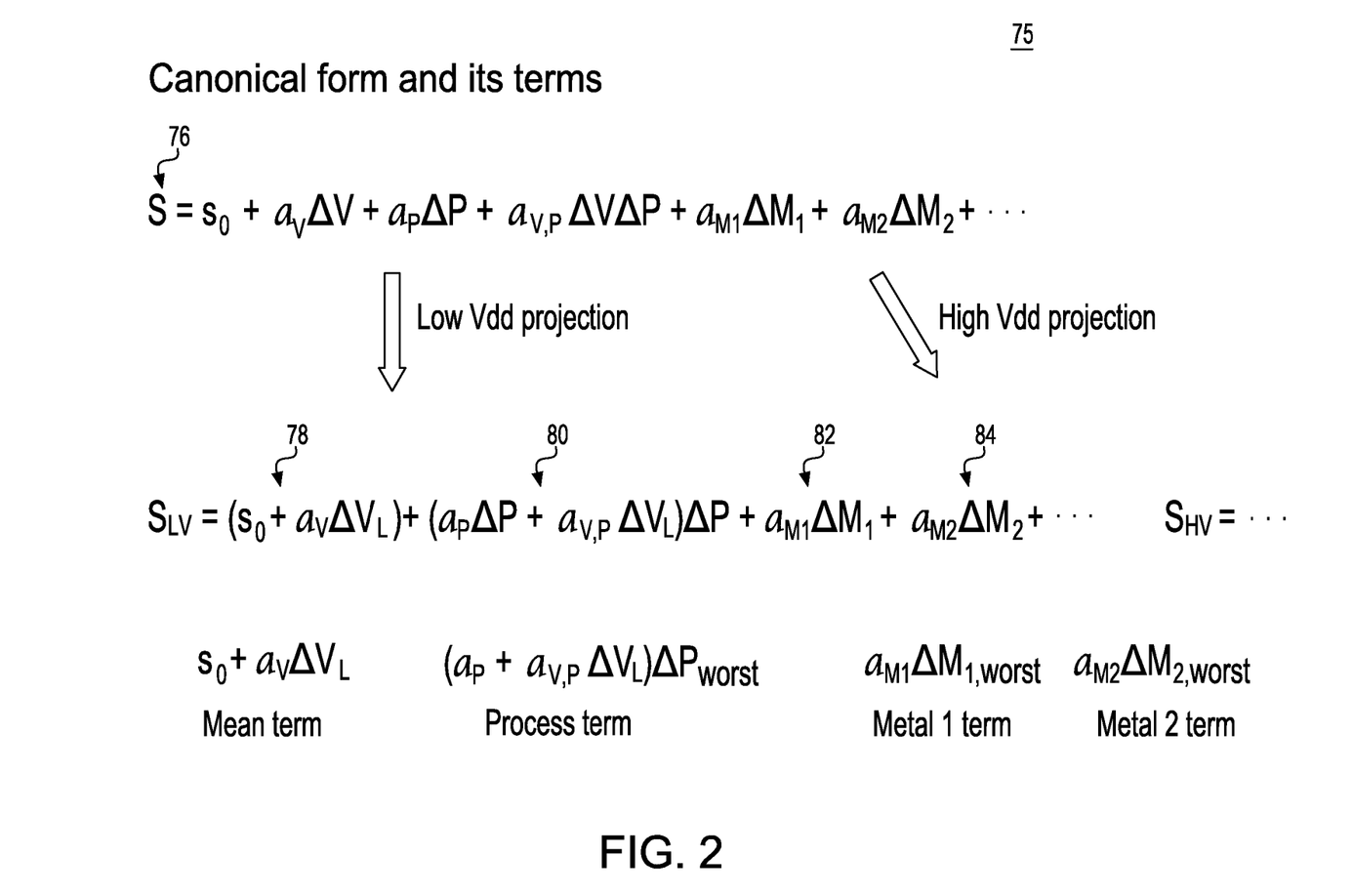
FIG. 2 shows a non-limiting example use of a canonical form (statistical distribution) representation for a "setup" timing failure slack.

FIG. 2 shows a non-limiting example use of a canonical form (statistical distribution) representation 75 for a "setup" timing failure slack. Other canonical forms representing statistical distributions of other timing analysis parameters, e.g., hold times, slew rate, arrival times, may be used. In the example of FIG. 2, a general canonical form representation for a setup timing failure slack (S) 76 can be projected at different corner conditions, i.e., projections modelling the variability of a plurality of parameters. For example, FIG. 2 shows a canonical form of a projected slack $S_{LV}$ of a low power supply voltage Vdd corner condition. The canonical form shows slack S that may include terms as functions of certain process variables at a low or high Vdd corner condition operating model: a first mean term 78 with the delta low Vdd voltage ($\Delta V_L$) design variable; a process term 80 as a function of a worst case $\Delta P_{worst}$ value scenario, i.e., the bounded process state of parameter P that results in the minimum slack projection, where P may represent such physical characteristics as Silicon Process performance off of a production line; a first metal level term 82 as a function of a worst case $\Delta M_{1, worst}$ metal thickness design variable (which effectively models variation in metal volume, directly impacting resistance and capacitance); a second metal level term 84 as a function of a second worst case metal thickness design variable, e.g., $\Delta M_{2, worst}$, etc. A similar canonical form may be generated for a projected slack $S_{HV}$ associated with a high power supply voltage Vdd corner condition. In the case of timing slack, the minimum valued projection from these two voltage corners would be selected as the limiting solution. The method, in one embodiment, could be leveraged in MCMM (multi-corner, multi-mode) timing analyses, by computing local sensitivity values from the corner data for use in construction of canonical models as a post-process.

In a further embodiment, if N sources of variation are being modelled, there may be, in the worst case scenario, $2^N$ different runs (corners) to make as each process parameter may be run in two different ways, e.g., thin to thickest metal line, or lowest possible voltage to highest possible voltage, and various combinations. That is, each run will have a different setup timing failure slack (S) form 76 (and thus there would be $2^N$ canonical forms) evaluated.

In another embodiment, a sampling of corners may be implemented, which entails selecting a subset of corners, e.g., 100 corners, and these sampled corners are run in a distributed way. All 100 results would then be accumulated and a superset taken of all the fails that were detected, to ultimately work on fixing the timing violations based on these sampled corners results. Each of the 100 runs will have a different setup timing failure slack (S) form 76 (and thus there would be 100 canonical forms) evaluated.

As circuit elements are subject to various processing conditions, e.g., a design that works at multiple clock frequencies or voltages (multiple corner conditions), such variables are taken into account for the statistical timing analysis evaluations performed. For example, it may be determined that delay of a signal though a circuit (e.g., transistor or wire) is susceptible to a number of different variables. Thus, in the embodiments herein, a determination is made, not only as to a particular timing failure, e.g., delays, slews, but a reason as why the particular timing test failed, i.e., which of the plural sources of variation is causing a particular timing fail problem. For example, it may be known that a particular timing analysis failure may be predominantly due to given process variable, e.g., metal thickness variability (+/−tolerance) of a printed wire. In such a situation, the methods described herein will select a process variable that is known to change, e.g., decrease or increase, the sensitivity of the slack to that process variable.

For example, in a circuit having a data path leading to a latch input, if all metal lines (wires) are chosen to be on the same metal layer, the variabilities caused by presence of those physical wires at that layer will accumulate. However, in a wire rebalancing scheme, if some wire lines are designed to traverse another metal layer, e.g., a higher metal layer, then those wires no longer impact the lower wire level layer, and the chance of failure decreases at that lower metal level layer (i.e., the sensitivity of the slack changes with that rebalance of the sensitive variable (wire thickness) thereby improving slack).

Other ameliorative actions taken to change sensitivity of the slack may be to add a buffer along a timing path, e.g., provide less wire to change sensitivity to metal, or achieve an improved balance of a transistor gates and corresponding attached conductor (a "box") along a timing path, e.g., by moving the box to a different location along the path to correct gate or wire length imbalances.

Figure 3:
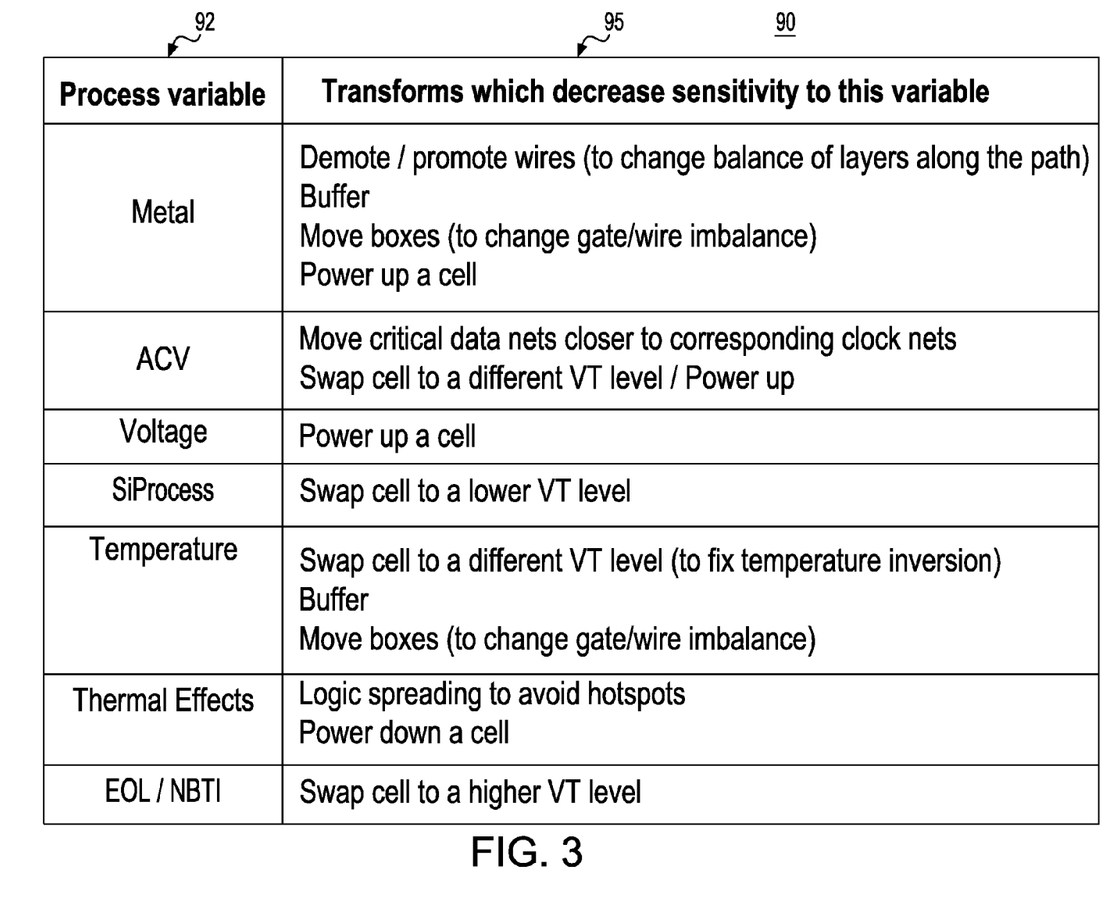
FIG. 3 shows an input data in the form of a table for mapping particular process variables against particular transforms designed for reducing sensitivities of that respective variable in one embodiment.

In embodiments herein, information regarding particular sensitivities of circuit structures and the one or more process variables/factors that contribute to that sensitivity are obtained and tabulated for storage as data structures in a memory, e.g., a database. FIG. 3 shows an example data table 90 relating particular process variables 92, e.g., metal, ACV (across chip variation), power up voltage, temperature, thermal effects, etc., to a corresponding transform(s) 95, e.g., move box, promote/demote wires, move critical data nets, swap cells to different Vt (threshold voltage) or different layer/level, critical, the should be implemented in the circuit design to change the related sensitivities, e.g., reduce a probability of a timing failure. In one embodiment, table 90 stores data and information defining the relationship between each transform, i.e., change in a process variable, and the impact it has on sensitivity values (e.g., per technology, not per design).

Figure 4A:
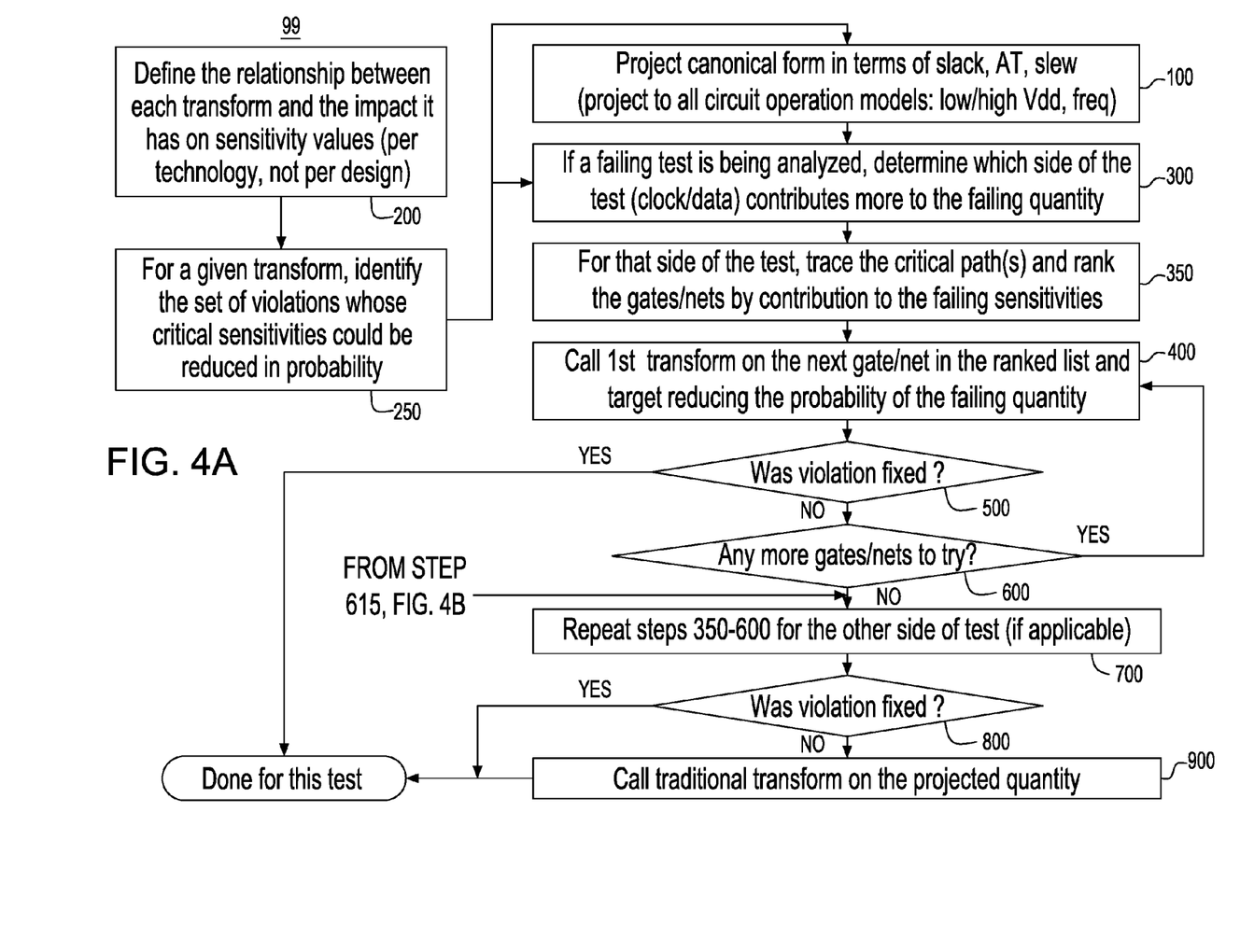
FIGS. 4A-4B depict a method for achieving timing closure in a design of VLSI circuits in presence of manufacturing and environmental variations.
Figure 4B:
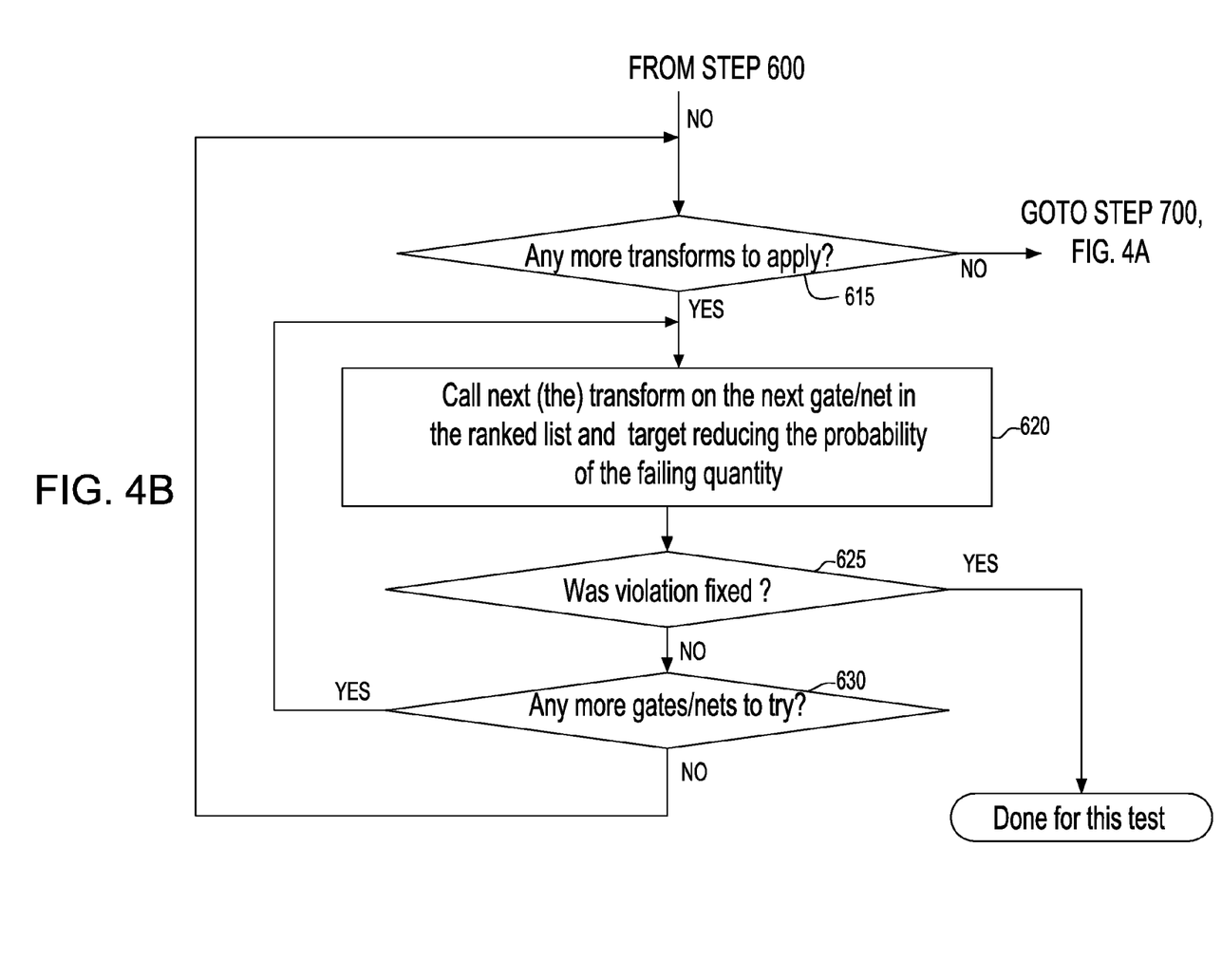

FIG. 4A-4B depict a method 99 for achieving timing closure in a design of VLSI circuits in presence of manufacturing and environmental variations. Timing closure refers to the process of making changes to an initial integrated circuit design to get rid of timing violations. In one embodiment, the method 99 of FIGS. 4A, 4B, may be used to target a particular sensitivity for analysis. At a first pre-processing step 200, there is shown the steps of defining the process variables and the related transforms to the design that can change sensitivity to the particular variable. This data and information is obtained from the chip manufacturer, e.g., mined from a source of such chip manufacturing data, to generate the data for table 90. This ensures the ability for the system to identify a set of violations whose critical sensitivities could be reduced in probability.

Beginning at 100, the statistical timing analysis includes projecting in the canonical form depicted in FIG. 2, e.g., in terms of slack S, such as shown in FIG. 2. It is understood that further analysis tests may be employed for further projecting a canonical form in terms of AT (latch arrival times), and circuit slew. In one embodiment, for the projection in canonical form in terms of slack, there may be included one or more circuit operation models including but not limited to: low Vdd (e.g., operating power supply) voltage, high Vdd, low frequency operation, high frequency operation, metal thickness variation (for each possible metal layer in the technology), across-chip variation, thermal effects, temperature variation, voltage-threshold mistrack, etc.

In one embodiment, at step 100, there is performed a sampling (a projection) of a bell curve corresponding to the statistical distribution of the slack based on the canonical form. Based on the samples, it may be determined whether a timing violation exists, e.g., a timing test failure. In one embodiment, the projection may be to the −3 Sigma point. Based on the sample, it is determinable whether the computed slack is greater or less than zero (if the projected canonical form is a slack).

This step may be similarly performed for any projected canonical form, e.g., slew or arrival time. For example, sampling a statistical distribution of a bell curve for the slew, given that there may be some pre-determined slew failure threshold or limit, a determination is made as to whether the sampling the slew distribution results in a slew above or below that limit. Similarly, the projection may be performed at a particular sigma point, or using Monte Carlo sampling, etc.

Upon determining a timing test failure at step 100, the process proceeds to 300, FIG. 4A, to determine whether there is a statistical timing violation detected in a particular circuit design, i.e., a computed negative slack S. This determination may be made based on the results of step 100 which provides the canonical form projection, e.g., of slack, AT, or slew, etc. at a particular corner condition, and the input of step 250 based on the data of table 90 obtained at 200. At 250, using table 90, for the particular sensitivity, there may be selected a particular transform, e.g., add a buffer. That is, as the statistical timing analysis program can automatically recommend a transform for the particular timing violation, as shown at 250, for a given transform, the method may identify the set of violations whose critical sensitivities could be changed in probability. Optionally, the method may apply said transform (design change) and incrementally re-calculate the resulting statistical timing which results from the change. The method further may accept or reject a particular transform (design change) according to the change in said failing timing quantity. For example, if the canonical form projection does not improve significantly (above a defined threshold) the method may decide that the design change should be rejected.

Thus, for example, there may be analyzed a projected canonical form of a slack S, e.g., at a −3σ slack S of the projected slack bell curve (statistical distribution). Particularly, the method performs sampling the canonical distribution at the −3σ slack S graph and a determination is made as to whether the slack S is a negative value for the sampled point. If the computed slack S is a negative value, the analysis is performed on the canonical form to determine what are the top sensitivities leading to the negative slack determination. For example, based on timing violation, it may be determined that the metal thickness and location is the top sensitivity leading to the negative slack determination. Thus, using the information at table 90 of FIG. 3, a transform is selected that would most likely change the sensitivity of the slack to the metal in the timing (data) path. For example, based on table 90, for a metal sensitivity, one transform selected may be to buffer or demote/promote wires (e.g., to change balance of layers along the path). A new timing analysis/simulation of the circuit design will then be conducted at the −3σ slack S to determine if the transform was successful in changing the sensitivity such that it may become a positive slack value, i.e. fixed the detected timing problem. Otherwise, a determination is made as to whether there are any further sensitivities that impacts the circuit design, and whether any other transform can be implemented to reduce those sensitivities.

In one embodiment, use is made of an incremental timer such that a circuit change may be made on the fly and the incremental timer is automatically invoked to determine the impact of the change. For example, as a result of a timing failure at a latch, if there is added a buffer to a wire, the incremental timer will generate a new slack determination that results downstream, e.g., at that latch input. Use of contents of table 90 ensures that a transform is provided that is known to change a sensitivity or improve the circuit. The method finds areas along the path that can implement the chosen transform, e.g., add an additional buffer to the circuit, as an attempt to fix the detected timing issue.

Then, for the whole circuit design, there is identified all of the failing quantities who have sensitivities that can be improved, e.g., with buffering. Thus, step 300 determines whether there is any particular element (e.g., circuit latch element) in the whole circuit design which may be failing due to a critical sensitivity that buffering can resolve. If there is determined a particular circuit element in which there is a known process parameter in which buffering would reduce sensitivity of, this element is a candidate for doing buffering on, e.g., the process parameter may be improved by buffering. This circuit element(s) thus become candidates for buffering.

In one embodiment, there may be determined from the existing canonical form, the top critical sensitivities, e.g., metal, which lead to the particular fail. If metal is one of the top sensitivities, then this circuit path would be a candidate for buffering (transform). If, for example, it is determined that metal is not among the top crucial sensitivities, then there is no need to buffer at the particular location.

Thus, in one embodiment, the method surgically targets reducing sensitivities in a knowledgable way as the transform is selected (given a critical sensitivity of a test fail), and knowing the transform, a set of all candidates (e.g., paths)

who may trigger the violations may be obtained, which candidates may then be subject to application of the transform.

In an alternate embodiment, there may first be selected a given path, and using table 90, there may be determined a transform(s) that can be called at that given path.

Further, at step 300, in the case of slew, there is only one path of logic that contributes to the slew. However, in the case of a slack (timing setup/hold) test, there are two paths of logic leading to that: either a data path or the clock path. At step 300, it is thus determined which path is more important for applying a transform based on the sensitivities of the respective paths, e.g., a data path of higher sensitivity will be selected over a corresponding clock path of a determined lesser sensitivity.

Figure 5:
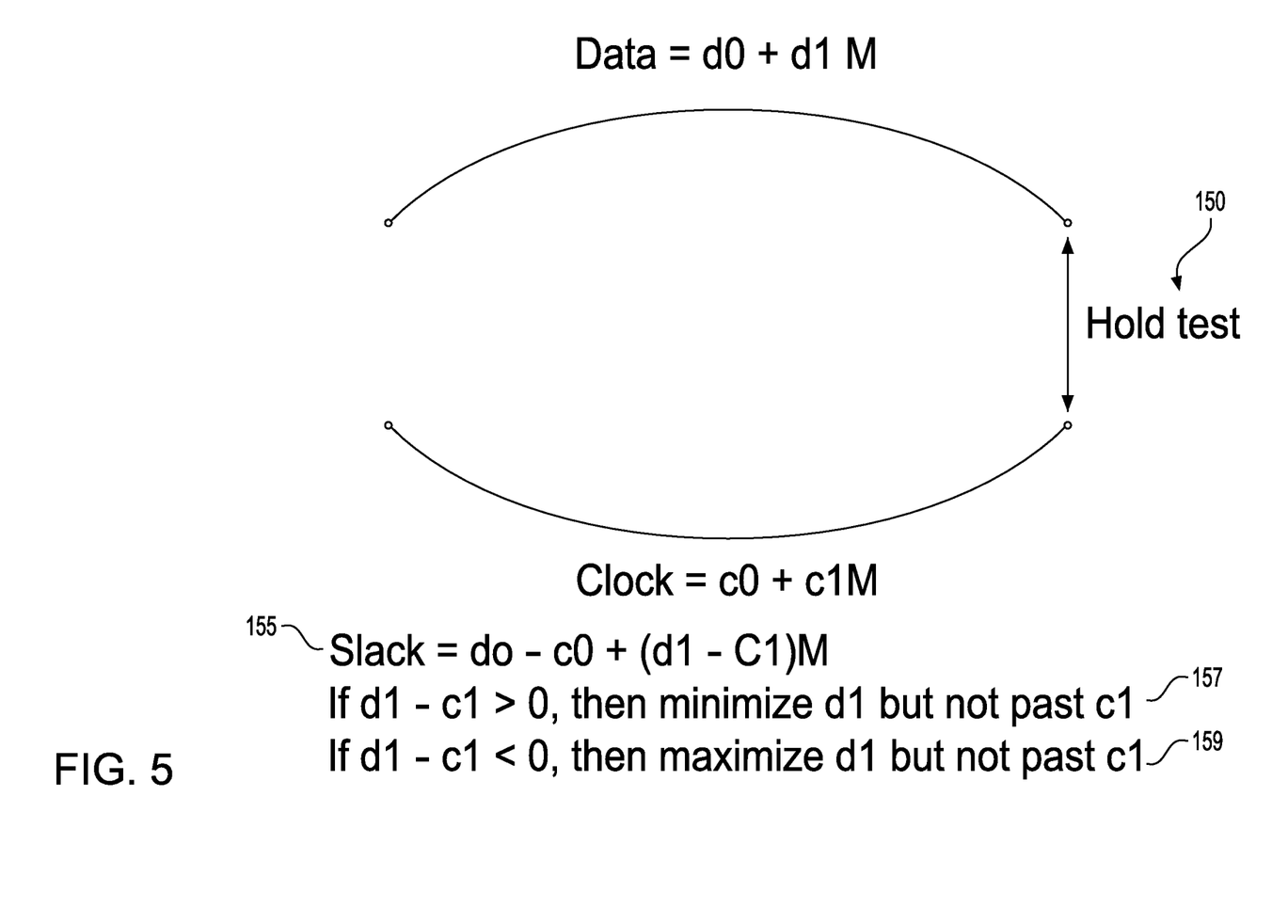
FIG. 5 shows an example of modifying the sensitivity of a given process variable as a result of a given hold test, that considers metal as the source of variation.

For example, as shown in FIG. 5, a particular target sensitivity (e.g., thin vs. thick metal M) is selected based on an example timing "hold" test 150 that has failed. Using a hold test as an example, this could be achieved by either increasing or decreasing the sensitivities on the data AT to better match the clock AT.

In the method, there is a given slack formula 155 that has initially produced a negative value. From the analysis, it can be seen that d1 and c1 are the respective data arrival time (AT) and clock AT sensitivities (e.g., to metal) and d0 and c0 are the mean data and clock ATs. By comparing the relative sensitivities of the "data side" versus the "clock side," a particular sensitivity may be targeted. For example, given a clock path sensitivity (e.g., to metal thickness) of some value, if a data path sensitivity (e.g., to the metal thickness) can be achieved to match that clock sensitivity, then these sensitivities will cancel (due to d1−c1=0). This is because if the sensitivities match on both clock and data sides, they do not influence the slack. Thus, in FIG. 5, at 157, if it is determined that the sensitivity of the data path d1 is greater than the sensitivity of the clock path c1, then by reducing the sensitivity (to metal thickness) of the data path (d1) will render the slack sensitivity zero such that the influencing effect of both data and clock path sensitivities are canceled. Alternatively, at 159, if it is determined that the sensitivity of the clock path c1 is greater than the sensitivity of the clock path d1, then by increasing the sensitivity of the data path (d1) (to the metal thickness) to get it closer to the sensitivity of clock path c1 will achieve a slack sensitivity of zero such that the influencing effect of both data and clock path sensitivities are canceled. Thus, in some instances, increasing the sensitivity of a particular variable may render the source of variability less critical.

Continuing at 350, for that selected side of the test, e.g., data path, the method performs tracing the critical path(s) leading to the failure pin. In the example circuit of FIG. 1B, for instance, combinatorial logic element 61 may include various wire paths each of which may have respective gates (e.g. transistor device or like components) and nets or conductors that interconnects two or more components (gates/nets). In an example of FIG. 1B, element 61 may include 10 inverter devices 67, and corresponding 10 wires (paths) 68 and possibly other logic or combinatorial element(s) 69 leading to that pin 56A which has failed (e.g., 10 paths) statistical timing analysis. In an example scenario of applying a "buffer" transform for addressing a sensitivity to metal, then the 10 wire paths 68 would be of concern and possibly subject to the buffering transform. At step 350, the determination is made by querying a statistical tool timer as to how much each wire path 68 (e.g., of the 10 paths) contributes to the sensitivity. The amount of contribution to the sensitivity of each path is determined, and the paths (e.g., all 10 wires) are ranked in order according to their contribution.

It should be understood that, in one embodiment, path tracing is not absolutely required. For example, a simple node-based optimization technique could leverage the main idea of the methods described herein.

Figure 1B:
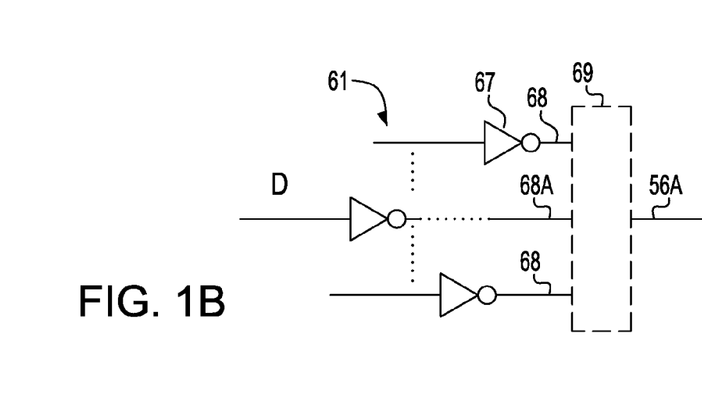
FIG. 1B depicts an example circuit diagram of an example combinatorial logic element 61 of FIG. 1A showing various wire paths each which may have respective gates/nets.

In one embodiment, the method ranks the gates/nets (path elements) by contribution to the failing sensitivities. For example, as shown in FIG. 1B, a path 68A may have a wire that is longer than the wires of other paths 68 which may double the sensitivity of this wire path 68. The statistical timing analysis tool analyzes the statistical distribution form at the failing pin 56A, finds the failing sensitivity or sensitivities, and ranks each traced back wire in path 68 leading to the failed pin 56A, e.g., by comparing the difference in sensitivities between the input and an output of said wire in path 68.

Given the ranking of the contributing wires (e.g., most sensitive to least sensitive) leading to the failed pin, the method then proceeds to 400, FIG. 4A to call the transform, e.g., buffering, on the first (most sensitive) wire (or gate/net) in the ranked list for reducing the probability of the failing quantity at the target pin. This is followed at 500 by running a timing analysis simulation, e.g., by an incremental timer of the STA tool, and determining whether the timing violation has been completely fixed. If the applied transform does completely fix the timing violation, e.g., a positive slack result, then the test is completed. If however, the applied transform does not completely fix the timing violation, the method proceeds to 600 to determine if there are any more nets or gates to apply that contribute to changing the sensitivity. For example, it may be determined that the timing violation may be have been improved (increased slack, e.g., from −100 ps to −50 ps) but not fixed. If there are more nets or gates to apply that contribute to the timing sensitivity, the process returns to 400 to call the transform, e.g., buffering, on the next (most sensitive) wire (or gate/net) in the ranked list for reducing the probability of the failing quantity at the target pin.

Steps 400-500, FIG. 4A, are repeated for each next net/gate on the ranked list until the timing failure at the subject pin has been corrected. It is understood that at each iteration, if the applied transform of that gate/net results in an improved slack, the solution is kept for the next iteration. That is, each transform that leads to improvement (reduced probability of the failing quantity) is added to the final solution leading to the fixed timing violation. In the illustrative circuit of FIG. 1B, it may be determined that a buffering transform applied to each of the first, fourth and eight wire paths 68 of the 10 wire paths may be sufficient to fix the timing violation at pin 56A.

If, after performing simulations with the transforms applied to each net/gate in the ranked list order, it is determined that the timing violation has not been completely fixed, then the process proceeds to 700 which is a process that repeats steps 350-600 for the other side of test, e.g., the clock path (if applicable). Thus, the determining the sensitivities, tracing back the gates/nets of the paths leading to the timing failure, and ranking the top contributors to the sensitivities leading to the type of failure, is performed for clock path. In the repeat of steps 350-600, it is then determined at 800 whether the timing violation has been fixed based on a particular transform(s) added. If the violation was fixed, then the process is complete.

If the violation has not been fixed, then at 900, the process proceeds to call the traditional transform on the projected quantity.

In a further embodiment, as shown in FIG. 4B, the no path of step 600, FIG. 4A, may include a further step 615 of determining whether there are any more transforms to apply to the circuit gate/nets leading to the failed pin. For example, while a buffering transform may be the first transform applied to the wire paths, it may be determined at 615 that there is another transform that could be applied. For example, in the case of sensitivity to metal variations, another transform besides buffering the metal, may be to demote/promote a wire, change a threshold voltage of a transistor, re-size a gate, move a box or power up a cell.

Thus, for the given critical path(s) traced, and given the rank of the gates/nets by contribution to the failing sensitivities, at 620, that next transform is called (e.g., demote/promote a wire), on the first (most sensitive) wire (or gate/net) in the ranked list for reducing the probability of the failing quantity at the target pin. Then, as followed at 625, by running a timing analysis simulation, e.g., by an incremental timer of the STA tool, it is further determined whether the timing violation has been completely fixed. If the applied transform does completely fix the timing violation, e.g., a positive slack result, then the test is completed. If however, the applied transform does not completely fix the timing violation, then the method proceeds to 630 to determine if there are any more nets or gates to apply that contribute to changing the sensitivity. If there are more nets or gates to apply that contribute to decreasing the slack sensitivity, the process returns to 620 to call the transform, e.g., move/promote wire, on the next (most sensitive) wire (or gate/net) in the ranked list for reducing the probability of the failing quantity at the target pin.

Steps 620-625 are repeated for each next net/gate on the ranked list until the timing failure at the subject pin has been corrected. Each iteration refines the solution and increases the optimization performed. It is understood that at each iteration, if the applied transform of that gate/net results in an improved slack, the solution is kept for the next iteration. That is, each transform that leads to improvement (reduced probability of the failing quantity) is added to the final solution leading to the fixed timing violation. In the illustrative circuit of FIG. 1B, it may be determined that promoting or demoting third and seventh wire paths 68 of the 10 wire paths may be further needed in order to fix the timing violation at pin 56A.

If it is finally determined at 630 that each gate net of the ranked list has been transformed and the violation is not fixed, the process returns back to step 615 to determine whether there are any more transforms that could be called to address the given timing failure for the connected gates/nets. If at 615 if it is determined that another transform could be applied, e.g., powering up a cell, then the process steps 620-630 are repeated using that transform to further reduce probability of a timing failure due to sensitivities of the metal wiring. Otherwise, at 615, if there are no further transforms that could be applied, then the process returns to step 700, FIG. 4A for further processing.

In the example circuit 61 of FIG. 1B, there may be a gate delay sensitivity to the metal which may be further changed by a re-powering transform (e.g., powering-up/powering down a gate), or an element such as inverter 67. Any latch or any logic element may be-resized (selected from an EDA tool library of electronic device sizes) to address the particular gate delay sensitivity. A ranking of elements contributing to this type of sensitivity may be further determined using this analysis for the element(s) in each of the paths 68.

Thus, there is provided a system, method and computer program product for analyzing the entire path and taking the entire path into account in a more robust and efficient manner. Without reliance of on any pre-characterized information, the system and methods instead re-assess the timing after applying the transform(s).

The system and method picks an optimization, and then finds specific sections of failing paths that contribute the most to the criticality. The system and method then applies transforms targeted to specific sources of variability.

In one aspect, the system and method looks at a particular circuit and an existing sensitivity signature for a failing timing slack, and guides an optimization engine on how best to repair the timing failure given the signature.

The system and method further identifies a cause of timing violations, i.e., sources of variations with too high variability, using statistical timing, and uses this knowledge to fix timing fails in a power-efficient manner.

Figure 6:
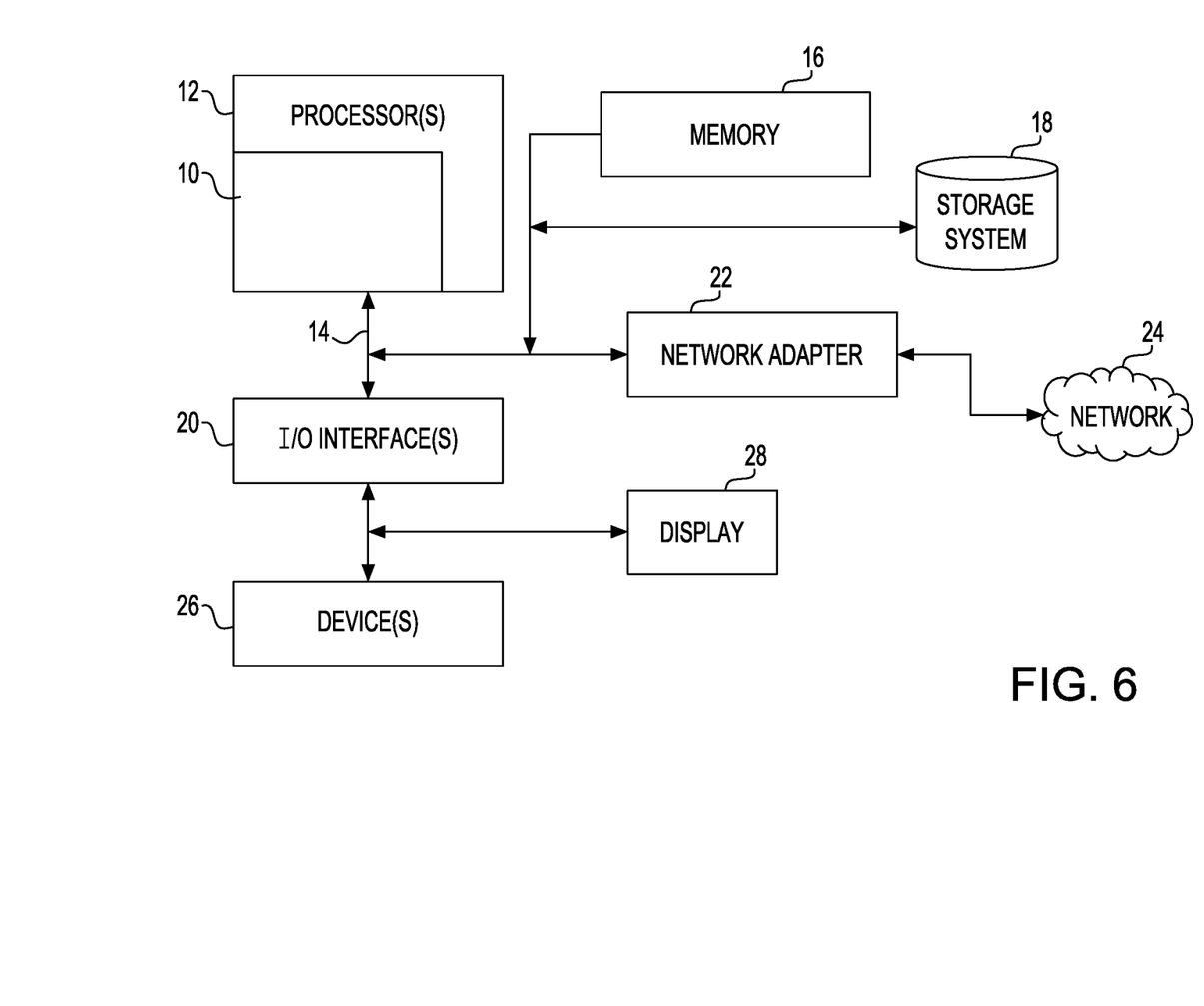
FIG. 6 illustrates a schematic of an example computer or processing system for implementing the methods depicted in FIGS. 4A, 4B.

FIG. 6 illustrates a schematic of an example computer or processing system that may implement the method to apply the optimization of circuit designs using statistical timing analysis in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the statistical timing analysis and timing optimization process flow according to the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of manufacturing an integrated circuit comprising:
    using a computer, running a statistical timing analysis (STA) for identifying timing violations at a location in a circuit design;
    for an identified timing violation, determining a failing sensitivity resulting in said timing violation;
    using said computer, identifying one or more gates/nets which contribute to the failing sensitivity at the location;
    using said computer, receiving and applying a transform comprising a design change on one or more of the gates/nets to reduce sensitivity to a process variable associated with the failing sensitivity at the location and statistically reduce a probability of the failing sensitivity at the location;
    using the computer, conduct a further statistical timing analysis for determining whether the timing violation was corrected using said applied transform; and
    in response to determining that the timing violation was not corrected, iteratively applying the transform to the one or more gates/nets based on a ranked list ordering of paths associated with the one or more gates/nets until the timing violation is corrected.

2. The method of claim 1, wherein said identifying one or more gates/nets comprises: tracing a critical path and/or paths of said paths and ranking the one or more gates/nets by contribution to said process variable associated with the failing sensitivity at the location.

3. The method of claim 1, wherein the determining a failing sensitivity resulting in said timing violation further comprises:
    accessing data that maps a relationship between a source of variability of the process variable and how the transform impacts that source of variability.

4. The method of claim 2, wherein the ranking of a gate/net of the one or more gates/nets is based on a process variable that contributes most to sensitivity at a failing timing violation at the location of said circuit.

5. The method of claim 2, wherein if it is determined that the timing violation was not completely corrected using said applied transform, the method further comprises: iteratively applying multiple transforms, with each transform applied across each said gates/nets in a ranked order that contributes most to sensitivity at a failing timing point of said circuit.

6. The method of claim 1, wherein a timing violation is a failed timing quantity selected from the group consisting of: a test slack, a slew, an arrival time, a required arrival time, and a capacitance.

7. The method of claim 6, further comprising: using the computer to project statistical sensitivity information for said identified timing violation in a canonical form, said canonical form representing a statistical distribution of said process variable contributing to the failed timing quantity for projection to all circuit operation models, wherein a circuit operation model includes modeling using one or more of: a low Vdd voltage, high Vdd, low frequency operation, high frequency operation, metal thickness variation, across-chip variation, thermal effects, temperature variation, and voltage-threshold mistrack.

8. The method of claim 6, further comprising: determining whether a data test side or a clock test side contributes more to the failing timing quantity at a circuit element; and projecting said statistical sensitivity information for said identified timing violation for that side of the test.

9. An apparatus for manufacturing an integrated circuit comprising:
a hardware processor;
a memory storage device storing instructions, said instructions for configuring the hardware processor to perform a method to:
run a statistical timing analysis (STA) for identifying timing violations at a location in a circuit design;
for an identified timing violation, determine a failing sensitivity resulting in said timing violation;
identify one or more gates/nets which contribute to the failing sensitivity at the location;
receive and apply a transform comprising a design change on one or more of the gates/nets to reduce sensitivity to a process variable associated with the failing sensitivity at the location and statistically reduce a probability of the failing sensitivity at the location;
conduct a further statistical timing analysis for determining whether the timing violation was corrected using said applied transform; and
in response to determining that the timing violation was not corrected, iteratively apply the transform to the one or more gates/nets based on a ranked list ordering of paths associated with the one or more gates/nets until the timing violation is corrected.

10. The apparatus of claim 9, wherein to identify one or more gates/nets, the hardware processor is further configured to: trace a critical path and/or paths of said paths and ranking the one or more gates/nets by contribution to said process variable associated with the failing sensitivity at the location.

11. The apparatus as claimed in claim 9, wherein to determine a failing sensitivity resulting in said timing violation, said hardware processor is further configured to:
access data that maps a relationship between a source of variability of the process variable and how the transform impacts that source of variability.

12. The apparatus of claim 10, wherein the ranking of a gate/net of the one or more gates/nets is based on a process variable that contributes most to sensitivity at a failing timing violation at the location of said circuit.

13. The apparatus of claim 10, wherein if it is determined that the timing violation was not completely corrected using said applied transform, said hardware processor is further configured to:
iteratively apply multiple transforms, with each transform applied across each said gates/nets in a ranked order that contributes most to sensitivity at a failing timing point of said circuit.

14. The apparatus of claim 9, wherein a timing violation is a failed timing quantity selected from the group consisting of: a test slack, a slew, an arrival time, a required arrival time, and a capacitance.

15. The apparatus of claim 14, wherein said hardware processor is further configured to:
project statistical sensitivity information for said identified timing violation in a canonical form, said canonical form representing a statistical distribution of said process variable contributing to the failed timing quantity and projected on one or more circuit operation models, wherein a circuit operation model includes modeling using one or more of: a low Vdd voltage, high Vdd, low frequency operation, high frequency operation, metal thickness variation, across-chip variation, thermal effects, temperature variation, and voltage-threshold mistrack.

16. A computer program product comprising:
a non-transitory computer readable media embodying a program of instructions executable by a processing unit for achieving timing closure in a design of an integrated circuit in presence of manufacturing variations, the program of instructions, when executing, performing a method comprising:
running a statistical timing analysis (STA) for identifying timing violations at a location in a circuit design;
for an identified timing violation, determining a failing sensitivity resulting in said timing violation;
identifying one or more gates/nets which contribute to the failing sensitivity at the location;
receiving and applying a transform comprising a design change on one or more of the gates/nets to reduce sensitivity to a process variable associated with the failing sensitivity at the location and statistically reduce a probability of the failing sensitivity at the location;
conducting a further statistical timing analysis for determining whether the timing violation was corrected using said applied transform; and
in response to determining that the timing violation was not corrected, iteratively applying the transform to the one or more gates/nets based on a ranked list ordering of paths associated with the one or more gates/nets until the timing violation is corrected.

17. The computer program product of claim 16, wherein said identifying one or more gates/nets comprises: tracing a critical path and/or paths of said paths and ranking the one or more gates/nets by contribution to said process variable associated with the failing sensitivity at the location.

18. The computer program product of claim 16, wherein the determining a failing sensitivity resulting in said timing violation further comprises:
accessing data that maps a relationship between a source of variability of the process variable and how the transform impacts that source of variability.

19. The computer program product of claim 17, wherein the ranking of a gate/net of the one or more gates/nets is based on a process variable that contributes most to sensitivity at a failing timing violation at the location of said circuit.

20. The computer program product of claim 17, wherein if it is determined that the timing violation was not completely corrected using said applied transform, the method further comprises: iteratively applying multiple transforms, with each transform applied across each said gates/nets in a ranked order that contributes most to sensitivity at a failing timing point of said circuit.

21. The computer program product of claim 16, wherein a timing violation is a failed timing quantity selected from the group consisting of: a test slack, a slew, an arrival time, a required arrival time, and a capacitance.

22. The computer program product of claim 21, wherein the method further comprises:
projecting statistical sensitivity information for said identified timing violation in a canonical form, said canonical form representing a statistical distribution of said process variable contributing to the failed timing quantity for projection to all circuit operation models, wherein a circuit operation model includes modeling using one or more of: a low Vdd voltage, high Vdd, low frequency operation, high frequency operation, metal thickness variation, across-chip variation, thermal effects, temperature variation, and voltage-threshold mistrack.

* * * * *